United States Patent
Bojko et al.

(10) Patent No.: US 6,585,422 B1
(45) Date of Patent: Jul. 1, 2003

(54) METHOD FOR PROVIDING PREFORMED CONDUCTOR PIECES, CONNECTING COMPONENT FOR CONNECTING PREFORMED CONDUCTOR PIECES, AND OPTICAL WAVEGUIDE DRUM

(75) Inventors: Helmut Bojko, Niederviehbach (DE); Gregor Popp, München (DE); Wilfried Witzke, Würzburg (DE)

(73) Assignees: Siemens Aktiengesellschaft, Munich (DE); Bayerische Motorenwerks, Munich (DE)

( * ) Notice: Subject to any disclaimer, the term of this patent is extended or adjusted under 35 U.S.C. 154(b) by 89 days.

(21) Appl. No.: 09/603,746

(22) Filed: Jun. 26, 2000

(30) Foreign Application Priority Data

Jun. 25, 1999 (DE) .......................... 199 29 176

(51) Int. Cl.⁷ ................................. G02B 6/38
(52) U.S. Cl. ........................................ 385/55
(58) Field of Search ........................... 385/55, 70, 72, 385/84, 98

(56) References Cited

U.S. PATENT DOCUMENTS

| | | | | |
|---|---|---|---|---|
| 5,287,426 A | * | 2/1994 | Shahid | 385/85 |
| 5,694,507 A | * | 12/1997 | Walles | 385/72 |
| 6,272,273 B1 | * | 8/2001 | Bookwalter et al. | 385/100 |
| 6,273,619 B1 | * | 8/2001 | Shahid et al. | 385/70 |

* cited by examiner

Primary Examiner—Tulsidas Patel
Assistant Examiner—Brian S. Webb
(74) Attorney, Agent, or Firm—Laurence A. Greenberg; Werner H. Stemer; Ralph E. Locher

(57) ABSTRACT

A method for providing preformed optical waveguide pieces includes the steps of connecting the ends of the optical waveguide pieces to one another through the use of connecting components, thereby producing an "endless" optical waveguide which is wound onto a drum. Upon being unwound from the drum, the individual optical waveguide pieces are available for further assembly. A connector for connecting conductor pieces and a drum configuration are also provided.

6 Claims, 1 Drawing Sheet

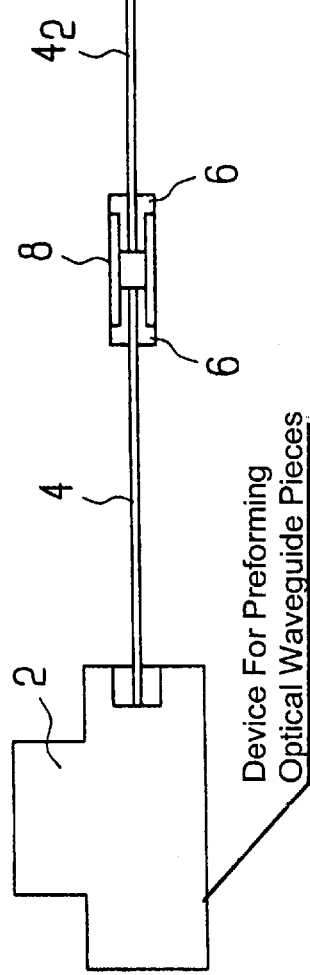
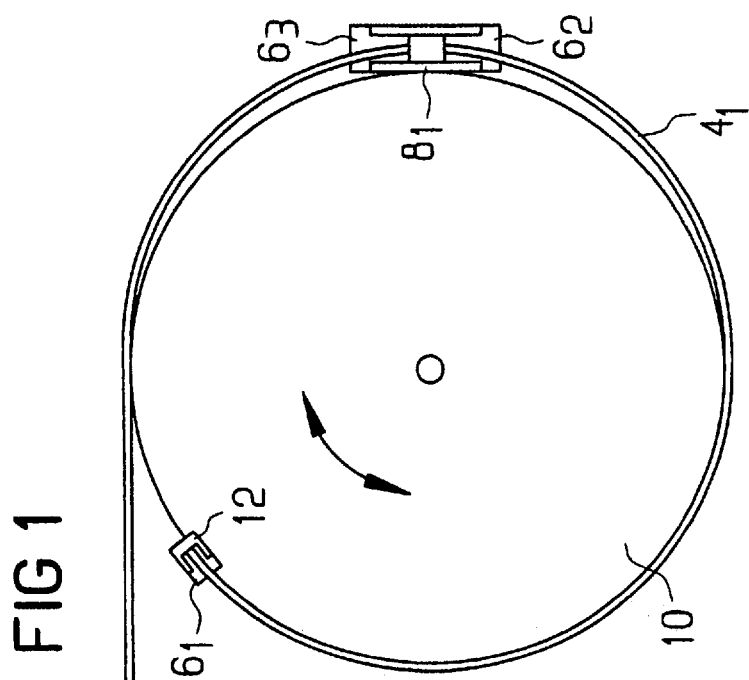
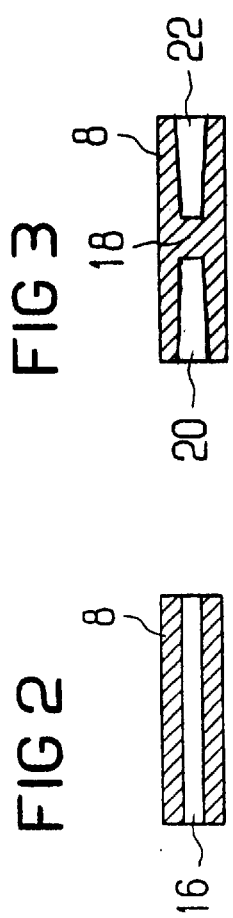
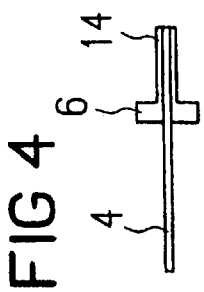

METHOD FOR PROVIDING PREFORMED CONDUCTOR PIECES, CONNECTING COMPONENT FOR CONNECTING PREFORMED CONDUCTOR PIECES, AND OPTICAL WAVEGUIDE DRUM

BACKGROUND OF THE INVENTION

Field of the Invention

The invention relates to a method for providing preformed conductor pieces, in particular optical waveguide pieces. The invention further relates to a connecting component for connecting the ends of two preformed conductor pieces. The invention additionally relates to a conductor drum.

Optical waveguides are increasingly used for a wide variety of applications. For their application in motor vehicles, in particular, they have to be produced or preformed in large numbers in different lengths, so that they are then available for the vehicle-specific installation. For that purpose, the optical waveguide pieces which have been preformed in the required length are usually provided in the form of individual lines with protective caps at their ends, in order to protect the light entry and exit windows against damage and contamination, and are made available for final assembly having been sorted in individual containers in a predetermined manner. This handling is complicated due to the space required and the numerous manual work steps and, furthermore, this process is associated with the risk of damage to the preformed optical waveguide pieces, for example caused by kinking.

SUMMARY OF THE INVENTION

It is accordingly an object of the invention to provide a method for providing preformed conductor pieces, a connector for connecting preformed conductor pieces and a drum configuration which overcome the above-mentioned disadvantages of the heretofore-known methods and devices of this general type and which simplify the provision or the placing at disposal of preformed optical waveguide pieces for the final assembly of the preformed optical waveguide pieces.

With the foregoing and other objects in view there is provided, in accordance with the invention, a method for providing preformed flexible conductor pieces, which includes the steps of:

providing individual preformed conductor pieces;

introducing and retaining one end of one of the preformed conductor pieces in a first receiving duct of a connecting component;

introducing and retaining one end of a further one of the preformed conductor pieces in a second receiving duct of the connecting component, the second receiving duct of the connecting component opening on a side of the connecting component opposite to an opening of the first receiving duct of the connecting component;

introducing and retaining a further end of the further one of the preformed conductor pieces in a receiving duct of a further connecting component for forming a connected conductor; and winding the connected conductor onto a drum.

In accordance with an advantageous mode of the invention, preformed optical waveguide pieces are used as the preformed conductor pieces.

In accordance with the method according to the invention, the individual preformed optical waveguide pieces are connected to form an "endless" optical waveguide and in the process are wound onto a drum. The individual optical waveguide pieces can be unwound serially from the drum and are available for the individual installation. The space requirements, the number of handling steps and the process reliability are notably improved compared with the conventional methods.

In accordance with a further mode of the invention, the ends of the conductor pieces are pushed into the receiving ducts thus causing an elastic deformation.

In accordance with a yet further mode of the invention, the ends of the conductor pieces are provided with connection parts, which respectively end in a connection pin which is pushed into the respective receiving duct.

With the objects of the invention in view there is also provided, in combination with preformed conductor pieces having end regions, a connector, including:

a connecting component having a substantially cylindrical shape defining an axial direction and having mutually opposite end faces;

the connecting component being formed with receiving ducts at the mutually opposite end faces for connecting the end regions of the preformed conductor pieces; and the receiving ducts extending substantially in the axial direction.

With the connecting component, the individual optical waveguide pieces can be connected serially to one another in a simple manner, thereby producing the "endless" optical waveguide which can be wound up on a drum.

In accordance with a further feature of the invention, the receiving ducts extend from the mutually opposite end faces along the axial direction such that the connecting component is formed with a through duct.

In accordance with yet a further feature of the invention, the connecting component has internal walls bounding the receiving ducts. The internal walls have a conical shape.

In accordance with another feature of the invention, the connecting component is an overall flexible component.

With the objects of the invention in view there is further provided, a drum configuration, including:

a drum body; and a conductor, in particular an optical waveguide, wound on the drum body, the conductor being formed of individual conductor pieces, in particular optical waveguide pieces, and connecting components, the individual conductor pieces having end regions, the connecting components connecting the individual conductor pieces at the end regions.

The invention can be used for a wide variety of conductor pieces or long objects, which are preformed or prefabricated in particular with regard to their length. The invention may be used for hose pieces for conducting pneumatic or hydraulic pressure, electrical conductor pieces; also cords, threads, etc., which conduct or transmit forces, for example.

Other features which are considered as characteristic for the invention are set forth in the appended claims.

Although the invention is illustrated and described herein as embodied in a method for providing preformed conductor pieces, in particular optical waveguide pieces, a connecting component for connecting preformed conductor pieces, and embodied in an optical waveguide drum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic view of a configuration illustrating the method according to the invention;

FIGS. 2 and 3 are sectional diagrammatic views of two embodiments of a connecting component according to the invention; and FIG. 4 is a diagrammatic view of an optical waveguide piece provided with a connection part.

DESCRIPTION OF THE PREFERRED EMBODIMENTS

Referring now to the figures of the drawings in detail and first, particularly, to FIG. 1 thereof, there is shown how optical waveguide pieces of predetermined length are preformed or prefabricated in an apparatus 2 whose structure is known per se. The optical waveguides may be composed of glass or plastic and the optical waveguides may be multilayer fibers or bundles of fibers. Advantageously, each preformed optical waveguide piece 4 is cut to length and then immediately provided with a connection part 6 (also see FIG. 4). As a result, the end of the optical waveguide piece is protected and yet can be conveniently handled and is available for subsequent connection to a transmitter or receiver. Two connection parts of different optical waveguide pieces 4 are connected to one another through the use of connecting components 8, thereby producing an "endless" optical waveguide which can be wound onto a drum 10.

The process of loading the drum is such that a first preformed optical waveguide piece $4_1$, having a connection part $6_1$ on its front end, is provided with a protective cap 12 in order to protect the light entry window. The protective cap 12 may be a simple plastic component. The protective cap 12 is inserted together with the connection part $6_1$ into a recess formed on the surface of the drum 10, so that the front end of the optical waveguide piece $4_1$ is held securely. The drum 10 is then turned in the clockwise direction until the optical waveguide piece $4_1$ has been wound on. The connection part $6_3$ provided on the front end of the optical waveguide piece $4_2$ is subsequently introduced into a connecting component $8_1$, into which the connection part $6_2$ provided on the rear end of the optical waveguide piece $4_1$ is likewise introduced. As a result, the two optical waveguide pieces $4_1$ and $4_2$ are connected to one another and can be wound serially onto the drum 10. The process is repeated, so that overall an "endless" optical waveguide can be wound up on the drum 10. It is noted that the illustration in FIG. 1 is not true to scale. The length of the optical waveguide pieces 4 is illustrated considerably shorter in comparison with the length or dimensions of the connection parts 6 and of the connecting components 8. The drum 10 has a radius such that the permissible bending of the optical waveguide pieces 4 is not exceeded.

The optical waveguide pieces 4 can advantageously be preformed or prefabricated and wound onto the drum 10 in a sequence which corresponds to the opposite or reverse order in which they are subsequently assembled. As a result, the correct optical waveguide piece is automatically available at a work station in each case upon being unwound from the drum 10.

The connection parts 6 (FIG. 4), which receive in them the ends of the optical waveguide pieces 4, can be configured in a wide variety of ways. If the optical waveguide pieces 4 are made of glass, the connection parts 6 may, for example, be molded or potted directly with the optical waveguide pieces 4. Fixing by bonding or by clamping is also possible. A connection part 6 advantageously ends in a connection pin 14 which is cylindrical overall and at whose end face the light entry or light exit window of the optical waveguide piece 4 is exposed. The connection part 6 may be composed of metal or plastic.

FIG. 2 shows an embodiment of a connecting component 8 which is configured like a piece of a hose through which a duct 16 passes. The diameter of the duct 16 is slightly smaller than the external diameter of the connection pin 14, so that the connection pin 14 can be pushed, with the duct 16 being slightly widened, into the hose-like connecting component 8 and is held in a frictionally locking manner therein.

FIG. 3 shows a modified embodiment of a connecting component 8, in which the duct 16 of FIG. 2 is interrupted centrally by a partition 18, with the result that a receiving duct 20 or respectively 22 proceeds from each end of the connecting component 8, which, overall, is configured in the shape of a hose or cylinder.

The embodiment in accordance with FIG. 3 has the advantage over that of FIG. 2 that the end of an optical waveguide piece which is pushed into the connecting component 8 is received in a manner protected against contamination even when only one end is pushed in. The connecting part 8 in accordance with FIG. 3 can be used as a protective cap 12 (FIG. 1).

It is noted that the exterior of the connection pin 14 may have a groove in order to allow air to escape when the connection part 6 is pushed into the connecting component 8.

The embodiments of the connecting components 8 according to FIGS. 2 and 3 have the advantage that the connecting components 8, if they are produced from correspondingly compliant plastic, are flexible overall, so that they adapt to the surface of the drum 10.

A wide variety of embodiments of connection parts 6 and connecting components 8 is possible. The connection parts 6 may, if appropriate, be completely omitted, so that the ends of the preformed optical waveguide pieces 4 can be pushed directly into the connecting components 8. The internal surfaces of the duct 16 or of the receiving ducts 20 and 22 may taper slightly conically from outside, so that frictional locking with the inserted end of the optical waveguide piece 4 is caused by the conical shape. Conversely, the connection pin 14 may taper conically, which facilitates its insertion and promotes the frictional locking.

Overall, the invention allows an extraordinarily simple intermediate storage and the provision of optical waveguide pieces which are preformed with regard to their length and, if appropriate, are provided with connection parts, for the further assembly of the optical waveguide pieces. The connecting components 8, particularly when they are constructed in accordance with FIG. 3, can be used as protective dust caps. Overall, the connecting components can be so simple that they are provided as disposable articles. Of course, reusability is also possible.

The invention can be used for a wide variety of conductor pieces or long articles, which are preferably prefabricated in different lengths, for example electrical conductors, hoses, in particular cord-like conductors, etc. The connecting components may be of a wide variety of types; for example, they may be in two parts and are fixed, clamped or hooked together after the ends of the conductor pieces have been inserted. The connection parts which are optionally fitted on the conductor pieces that have been produced with the correct length may also be configured in a wide variety of ways. In the case of electrical conductors, for example, the connection parts may end in flat contact prongs which are pushed into correspondingly configured connecting components.

We claim:

1. A method for providing mass-produced and preformed flexible conductor pieces with different lengths, the method which comprises:

producing individual preformed conductor pieces in required lengths;

providing connecting components, each having a first receiving duct and a second receiving duct;

introducing and retaining one end of one of the preformed conductor pieces in the first receiving duct of a connecting component;

introducing and retaining one end of a further one of the preformed conductor pieces in the second receiving duct of the connecting component, the second receiving duct of the connecting component opening on a side of the connecting component opposite to an opening of the first receiving duct of the connecting component;

introducing and retaining a further end of the further one of the preformed conductor pieces in a receiving duct of a further connecting component for forming a connected conductor;

winding the connected conductor onto a drum;

repeating the above steps to form an endless roll of connected conductor pieces, wound on the drum; and supplying the endless roll to a location for unwinding and disconnecting the connected conductor pieces for further processing.

2. The method according to claim 1, which comprises using preformed optical waveguide pieces as the preformed conductor pieces.

3. The method according to claim 1, which comprises:

pushing the one end of the one of the preformed conductor pieces into the first receiving duct of the connecting component thus elastically deforming the first receiving duct of the connecting component;

pushing the one end of the further one of the preformed conductor pieces into the second receiving duct of the connecting component thus elastically deforming the second receiving duct of the connecting component; and pushing the further end of the further one of the preformed conductor pieces into the receiving duct of the further connecting component thus elastically deforming the receiving duct of the further connecting component.

4. The method according to claim 1, which comprises:

providing respective connection parts on the one end of the one of the preformed conductor pieces, on the one end of the further one of the preformed conductor pieces, and on the further end of the further one of the preformed conductor pieces, the connection parts terminating in connection pins; and pushing the connection pins respectively into the first receiving duct of the connecting component, into the second receiving duct of the connecting component, and into the receiving duct of the further connecting component.

5. A drum configuration, comprising: a drum body; and a conductor wound on said drum body, said conductor being formed of individual preformed conductor pieces and connecting components, said individual preformed conductor pieces having end regions, said connecting components connecting said individual preformed conductor pieces at said end regions.

6. The drum configuration according to claim 5, wherein said conductor pieces are optical waveguide pieces.

* * * * *